United States Patent
Akavaram et al.

(10) Patent No.: US 12,197,775 B2
(45) Date of Patent: Jan. 14, 2025

(54) MEMORY DEVICES WRITE BUFFER MANAGEMENT

(71) Applicant: QUALCOMM Incorporated, San Diego, CA (US)

(72) Inventors: Santhosh Reddy Akavaram, Hyderabad (IN); Sonali Jabreva, Firozabad (IN); Prakhar Srivastava, Lucknow (IN); Surendra Paravada, Hyderabad (IN); Yogananda Rao Chillariga, Hyderabad (IN); Madhu Yashwanth Boenapalli, Hyderabad (IN)

(73) Assignee: QUALCOMM Incorporated, San Diego, CA (US)

( * ) Notice: Subject to any disclaimer, the term of this patent is extended or adjusted under 35 U.S.C. 154(b) by 12 days.

(21) Appl. No.: 18/189,141

(22) Filed: Mar. 23, 2023

(65) Prior Publication Data
US 2024/0319913 A1 Sep. 26, 2024

(51) Int. Cl.
*G06F 3/06* (2006.01)

(52) U.S. Cl.
CPC .......... *G06F 3/0656* (2013.01); *G06F 3/0659* (2013.01); *G06F 3/0679* (2013.01); *G06F 3/0604* (2013.01)

(58) Field of Classification Search
CPC .... G06F 3/0656; G06F 3/0659; G06F 3/0679; G06F 3/0613; G06F 3/0655; G06F 3/061
See application file for complete search history.

(56) References Cited

U.S. PATENT DOCUMENTS

| | | | | |
|---|---|---|---|---|
| 2012/0215997 A1* | 8/2012 | Stanfill | .................... | G06F 9/544 |
| | | | | 711/158 |
| 2020/0278806 A1* | 9/2020 | Hsieh | ..................... | G06F 3/0679 |
| 2021/0011642 A1 | 1/2021 | Lee | | |
| 2021/0034513 A1* | 2/2021 | Kim | ..................... | G06F 12/1491 |
| 2021/0141532 A1* | 5/2021 | Byun | ..................... | G06F 3/0611 |
| 2021/0294654 A1* | 9/2021 | Boenapalli | ............ | G06F 9/5016 |
| 2022/0229555 A1 | 7/2022 | Sela et al. | | |

(Continued)

FOREIGN PATENT DOCUMENTS

| | | |
|---|---|---|
| WO | 2014138118 A1 | 9/2014 |
| WO | 2016154088 A1 | 9/2016 |

OTHER PUBLICATIONS

International Search Report and Written Opinion—PCT/US2024/013154—ISA/EPO—Apr. 15, 2024.

*Primary Examiner* — Tracy A Warren
(74) *Attorney, Agent, or Firm* — Loza & Loza, LLP/Qualcomm

(57) ABSTRACT

Aspects of the present disclosure provide various techniques, apparatuses, and methods that can improve the write throughout of a data storage device. In some aspects, the storage device can be provided with multiple write buffers to improve write throughput. In some aspects, the data storage device can continue to handle commands using a command queue while performing a write buffer flush operation. Therefore, the data storage device can avoid suspending the write buffer flush operation when a new command is received by the command queue. In some aspects, the storage device can perform a write buffer flush operation when a command queue is not empty.

27 Claims, 8 Drawing Sheets

(56) References Cited

U.S. PATENT DOCUMENTS

| | | | |
|---|---|---|---|
| 2023/0137668 A1* | 5/2023 | Li | G06F 3/0688 |
| | | | 711/103 |
| 2023/0221885 A1* | 7/2023 | Moon | G06F 3/0656 |
| | | | 711/154 |

* cited by examiner

MEMORY DEVICES WRITE BUFFER MANAGEMENT

TECHNICAL FIELD

The technology discussed below relates generally to a data storage device, and more particularly, to techniques for improving write buffer throughput of a data storage device.

INTRODUCTION

A data storage device may use volatile memories and/or nonvolatile memories for storing data. A volatile memory cannot retain data stored therein at power-off, but a nonvolatile memory can retain data stored therein at power-off. Some examples of volatile memories include a static random access memory (SRAM), a dynamic RAM (DRAM), and a synchronous DRAM (SDRAM). Some examples of nonvolatile memories include a read only memory (ROM), a programmable ROM (PROM), an electrically programmable ROM (EPROM), an electrically erasable and programmable ROM (EEPROM), a flash memory device, a phase-change RAM (PRAM), a magnetic RAM (MRAM), a resistive RAM (RRAM), and a ferroelectric RAM (FRAM).

The flash memory device is widely used as a storage device in computing devices, mobile devices, and wireless communication devices to store large quantities of data. In some aspects, a host device can communicate with the flash memory-based storage device using a universal flash storage (UFS) interface defined by the JEDEC (Joint Electron Device Engineering Council) standard. A flash memory-based storage device can use a write buffer to improve performance such as writing speed or throughput. A write buffer is a temporary storage area used to store incoming write data before the data is written to the permanent or main storage media, such as a NAND flash memory. The write buffer can optimize the write performance of the storage device by allowing more efficient write operations to the NAND flash memory of the data storage device. For example, by using a write buffer, the data storage device can increase the write performance by reducing the number of write operations required to store incoming data, which can also help to extend the lifespan of the main storage. In some aspects, the write buffer can be implemented as a single-level cell (SLC) buffer. A SLC buffer can store a single bit of data per cell, resulting in higher write performance and greater endurance compared to a multi-level cell (MLC) buffer, which stores two or more bits of data per cell. In some aspects, a portion of the NAND flash memory can be configured as the SLC buffer.

BRIEF SUMMARY

The following presents a summary of one or more implementations in order to provide a basic understanding of such implementations. This summary is not an extensive overview of all contemplated implementations and is intended to neither identify key or critical elements of all implementations nor delineate the scope of any or all implementations. Its sole purpose is to present some concepts of one or more implementations in a form as a prelude to the more detailed description that is presented later.

Aspects of the present disclosure provide various techniques, apparatuses, and methods that can improve the write throughout of a data storage device. In some aspects, the storage device can be provided with multiple write buffers to improve write throughput. In some aspects, the data storage device can continue to handle commands using a command queue while performing a write buffer flush operation. Therefore, the data storage device can avoid suspending the write buffer flush operation when a new command is received by the command queue. In some aspects, the storage device can perform a write buffer flush operation when a command queue is not empty.

One aspect of the disclosure provides a data storage device that includes a nonvolatile memory including a main data storage, a first write buffer, and a second write buffer. The data storage device further includes a command queue configured to receive one or more commands from a host for accessing the nonvolatile memory. The data storage device further includes a memory controller configured to: retrieve a first command and first data from the command queue; store, based on the first command, the first data in the first write buffer before storing the first data in the main data storage; retrieve a second command and second data from the command queue; and store, based on the second command, the second data in the second write buffer in response to the first write buffer being unavailable for storing the second data.

Another aspect of the disclosure provides a method of using a data storage device. The method includes retrieving, from a host, a first command and first data from a command queue. The method further includes storing, based on the first command, the first data in a first write buffer before writing the first data to a main data storage. The method further includes retrieving, from the host, a second command and second data from the command queue. The method further includes storing, based on the second command, the second data in a second write buffer in response to the first write buffer being unavailable for storing the second data.

Another aspect of the disclosure provides a data storage device. The data storage device includes means for retrieving a first command and first data from a command queue. The data storage device further includes means for storing, based on the first command, the first data in a first write buffer before storing the first data in a main data storage. The data storage device further includes means for retrieving a second command and second data from the command queue. The data storage device further includes means for storing, based on the second command, the second data in a second write buffer in response to the first write buffer being unavailable for storing the second data.

To the accomplishment of the foregoing and related ends, the one or more implementations include the features hereinafter fully described and particularly pointed out in the claims. The following description and the annexed drawings set forth in detail certain illustrative aspects of the one or more implementations. These aspects are indicative, however, of but a few of the various ways in which the principles of various implementations may be employed and the described implementations are intended to include all such aspects and their equivalents.

DETAILED DESCRIPTION

Figure 1:
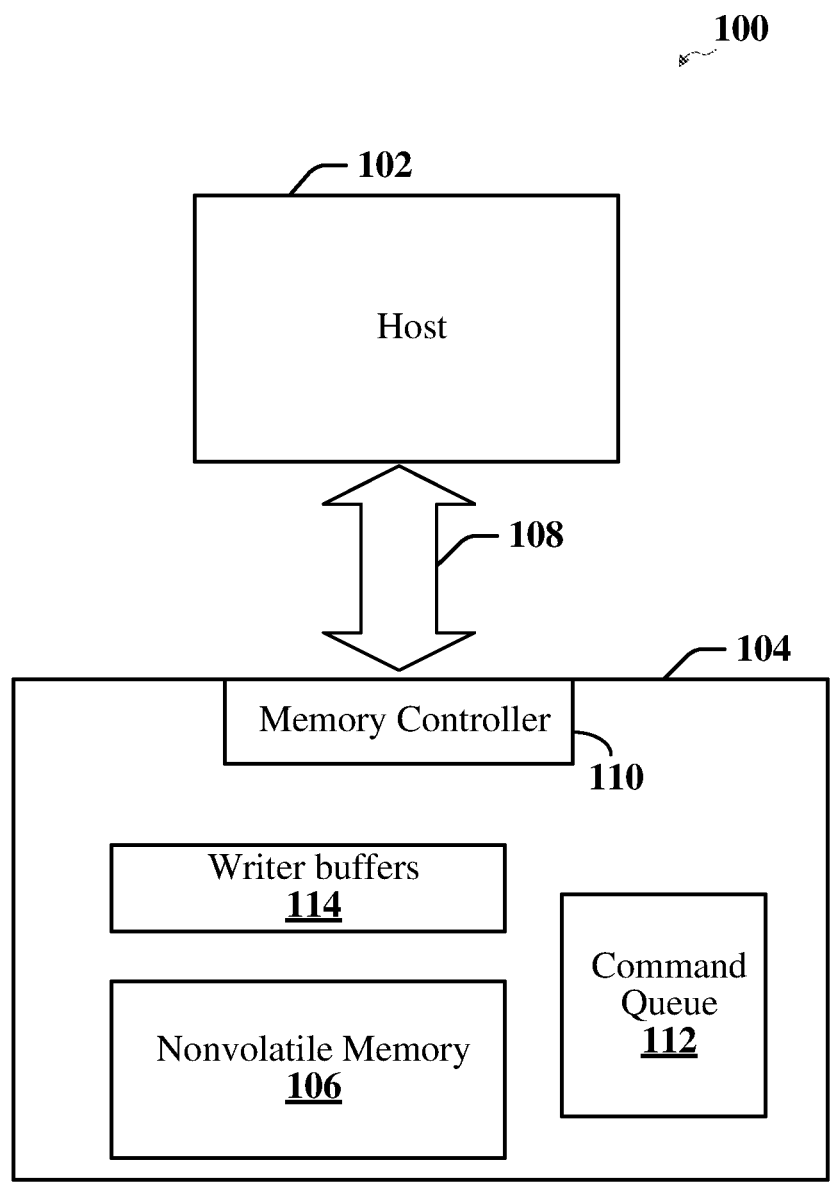
FIG. 1 is a block diagram illustrating a data storage system according to some aspects of the present disclosure.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, these concepts may be practiced without these specific details. In some instances, well-known structures and components are shown in block diagram form in order to avoid obscuring such concepts.

The terminology used herein is for the purpose of describing particular examples only and is not intended to be limiting. As used herein, the singular forms "a", "an" and "the" are intended to include the plural forms as well, unless the context clearly indicates otherwise. It will be further understood that the terms "comprises", "comprising,", "includes" and/or "including", when used herein, specify the presence of stated features, integers, processes, operations, elements, and/or components, but do not preclude the presence or addition of one or more other features, integers, processes, operations, elements, components, and/or groups thereof.

Further, many examples are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, these sequence of actions described herein can be considered to be embodied entirely within any form of computer readable storage medium having stored therein a corresponding set of computer instructions that upon execution would cause an associated processor to perform the functionality described herein. Thus, the various aspects may be embodied in a number of different forms, all of which have been contemplated to be within the scope of the claimed subject matter. In addition, for each of the examples described herein, the corresponding form of any such examples may be described herein as, for example, "logic configured to" perform the described action.

Some aspects of the disclosure provide a data storage device that uses nonvolatile memory (NVM) to store data. An example of nonvolatile memory is flash memory (e.g., NAND-based flash memory). The flash memory can provide a main storage for user data, for example, using multi-level cell (MLC) or triple-level cell (TLC) memory. The data storage device may use multiple write buffers to improve the write throughput of the data storage device. The write buffers can be implemented using single-level cell (SLC) memory that provides faster write speed as compared to the main storage memory. The data storage device can provide a command queue to receive commands (e.g., write commands with data to be written to the data storage device) for accessing the data storage device. When a write buffer is full, the storage device can perform a write buffer flush operation to move the data in the write buffer to the main storage.

Aspects of the present disclosure provide various techniques, apparatuses, and methods that can improve the write throughout of the storage device. In some aspects, the storage device can be provided with multiple write buffers to improve write throughput. In some aspects, the storage device can continue to receive and/or process commands in a command queue while performing a write buffer flush operation. Therefore, the storage device can avoid suspending the write buffer flush operation when a new command is received by the command queue. In some aspects, the storage device can perform a write buffer flush operation when a command queue is not empty.

FIG. 1 is a block diagram illustrating a data storage system 100 according to some aspects of the disclosure. A data storage system 100 may include a host 102 and a storage device 104. In some examples, the data storage system 100 may be implemented in a portable computer, a tablet, a smartphone, a wearable device, a wireless communication device, a base station or other network entity, etc. In some aspects, the host 102 may be a processor such as a central processing unit (CPU), a graphical processing unit (GPU), a digital signal processor (DSP): a controller, a microcontroller, an application processor (AP), a neural processing unit (NPU), a field-programmable gate array (FPGA), etc.

The host 102 can use the storage device 104 to store data for various operations. In some aspects, the storage device 104 may store data using one or more nonvolatile memory devices 106 (e.g., NAND flash memories). In one example, the storage device 104 and nonvolatile memory devices 106 may be compliant with the Universal Flash Storage (UFS) specification defined by JEDEC (Joint Electron Device Engineering Council). In one example, the host 102 can write data to and read data from the storage device 104 using a storage interface 108 (e.g., UFS interface). In some examples, the storage interface 108 can be implemented using various interface standards, for example, Peripheral Component Interconnect Express (PCIe), Serial Advanced Technology Attachment (ATA), etc. The host 102 can send a write command (with write data) to the storage device 104 in order to store the data in the storage device 104. To read data from the storage device 104, the host 102 can send a read command to the storage device 104 and receive data from the storage device 104. In one example, the host 102 and the storage device 104 can exchange information in the form of Universal Flash Storage Protocol Information Units (UPIUs). A UPIU can include various information transferred via the interface (e.g., interface 108) between the host 102 and the storage device 104. For example, the UPIU can include commands, data read from or written to the storage device 104, status information, and/or control information. For example, the status information in the UPIU can provide information about the status of the storage device 104 or the progress of a particular operation (e.g., write data to or read data from the storage device 104). The status information can provide details about whether an operation was successful, whether an error occurred, and what type of error occurred. The control information in the UPIU can be used to manage the communication between the storage device 104 (e.g., a UFS device) and the host 102. For example, the control information can include information about the device's configuration, power management, and other parameters related to data transfer between the host and the data storage device.

In some aspects, the storage device 104 may include a memory controller 110 for controlling the nonvolatile memory 106. The controller 110 manages the data flow between the nonvolatile memory 106 and the host 102. In some aspects, the controller 110 is responsible for performing various tasks such as error correction, wear leveling, garbage collection, and power management. For example, the memory controller 110 may write data to or read data from the nonvolatile memory 106 in response to a command (e.g., a UFS read or write command) received from the host 102. In some aspects, the memory controller 110 may be a processor such as a microprocessor, a microcontroller, an FPGA, etc. In one example, when the memory controller 110 receives a write command and write data from the host 102, the memory controller 110 can store the received data in the nonvolatile memory device 106 according to the write command. In one example, when the memory controller 110 receives a read command from the host 102, the memory controller 110 can read data stored in the nonvolatile memory device 106 according to the read command. Then, the memory controller 110 can provide the read data to the host 102, for example, via the interface 108. The storage device 104 may include a command queue 112 that stores the commands (e.g., write commands and read commands) and data received from the host 102. The command queue 112 can help improve the performance of the storage device by allowing it to process multiple commands simultaneously and/or optimize the order in which the commands are executed.

In some aspects, the storage device 104 may be configured to provide a write buffer 114 to support a boosted write function (e.g., a turbo write) to increase write speed or throughput of the storage device 104. For example, the host 102 can send commands to the memory controller 110 via the interface 108 to enable or disable the boosted write function. When the boosted write function is enabled, the storage device 104 can perform a boosted write operation to write data to the nonvolatile memory 106 at a write speed higher than that when the boosted write function is not used (i.e., a normal or non-boosted write function is used). In some aspects, the boosted write function may be performed using the write buffers 114 that can provide improved performance (e.g., improved write speed or throughout) than writing data directed to a main storage of the nonvolatile memory 106. The boosted write operation will be more fully described below with reference to the drawings.

In some aspects, the write buffers 114 can be a portion of the nonvolatile memory 106 configured as SLC memory cells. Each SLC memory cell can store one bit of information. In some aspects, the nonvolatile memory 106 can provide a MLC portion or a TLC portion to implement the main storage. In the MLC portion, each memory cell can store two bits of information. In the TLC portion, each memory cell can store three bits of information. In other aspects, it is contemplated that the nonvolatile memory 106 can support other configurations that allow more than 3 bits of information per cell. The SLC portion (write buffers) has higher data write speed and/or throughput than that of the MLC/TLC portion (main storage).

When the write buffers 114 of the storage device 104 are full, data will be written directly to the main storage instead of the write buffers. In this case, the write throughput of the storage device will decrease. The storage device 104 (e.g., memory controller 110) can execute a buffer flush operation to empty a certain write buffer. However, the storage device 104 may receive a command while flushing the write buffer. The storage device may suspend the buffer flush operation to prioritize the processing of the command in the command queue. After completing the command, the storage device 104 can resume buffer flush operation such that the write buffer can be used again for new write commands. Aspects of the disclosure provide techniques and apparatuses that can reduce or avoid the above-described write throughput reduction caused by the buffer flush operations or flush suspension.

In some examples, the host 102 and the storage device 104 may be implemented in compliance with the UFS protocol defined by JEDEC for the purpose of communicating with each other. In some aspects, the storage device 104 may further include any other storage space, for example, a cache memory, a reserved area, a meta area for storing meta data, in addition to write buffers, a command queue, and the nonvolatile memory illustrated in FIG. 1. However, for convenience of description, additional description associated with the other storage space will be omitted (or minimized), and the below description will be focused on the nonvolatile memory where user data are stored.

Figure 2:
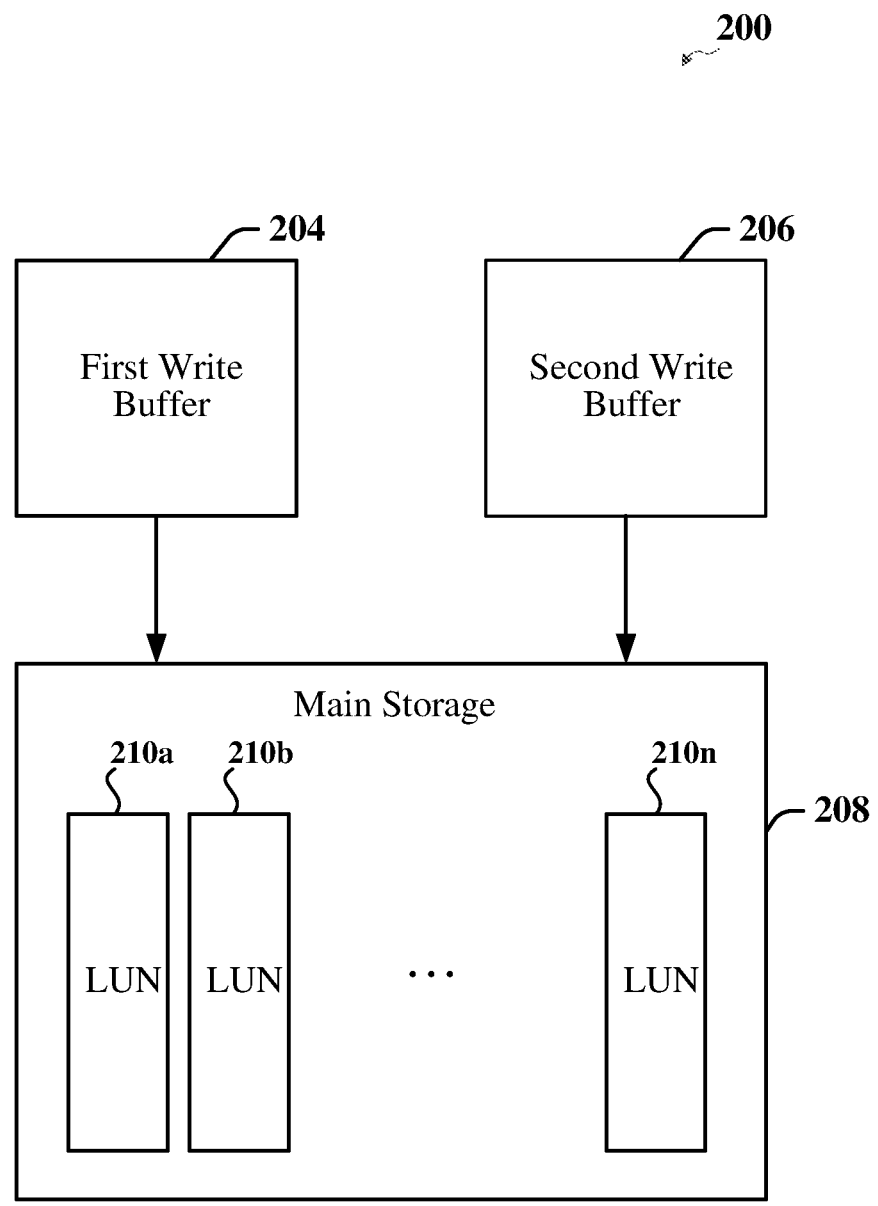
FIG. 2 is a block diagram illustrating a first storage device configuration according to some aspects of the present disclosure.

FIG. 2 illustrates a storage device configuration 200 according to some aspects of the disclosure. In one aspect, the storage device configuration 200 may be implemented using the storage device 104 of FIG. 1. For example, the nonvolatile memory 106 (FIG. 1) can be configured to provide one or more write buffers (e.g., a first write buffer 204 and a second write buffer 206, and a main storage 208 in which user data can be stored and retained. It is also contemplated that more than two write buffers can be configured in other examples. In one aspect, the main storage 208 can be configured using MLC or TLC memory, and the write buffers 204 and 206 can be configured as SLC buffers that provide faster write throughput as compared to the main storage 208. In some aspects, the main storage can be divided into multiple logical partitions or volumes, each of which can be assigned a unique logical unit number (LUN) (e.g., LUN 210a, 210b, . . . , and 210n shown in FIG. 2). The host (e.g., host 102) can access each LUN independently, treating each LUN as a separate storage device. In this example, all LUNs can share the write buffers. The write buffers can improve the write performance of the storage device by caching write data received from the host. Using the write buffers can reduce the number of write operations to the slower main storage 208, improving overall write throughput. In some aspects, it is contemplated that the storage device configuration 200 can provide more than two write buffers.

Figure 3:
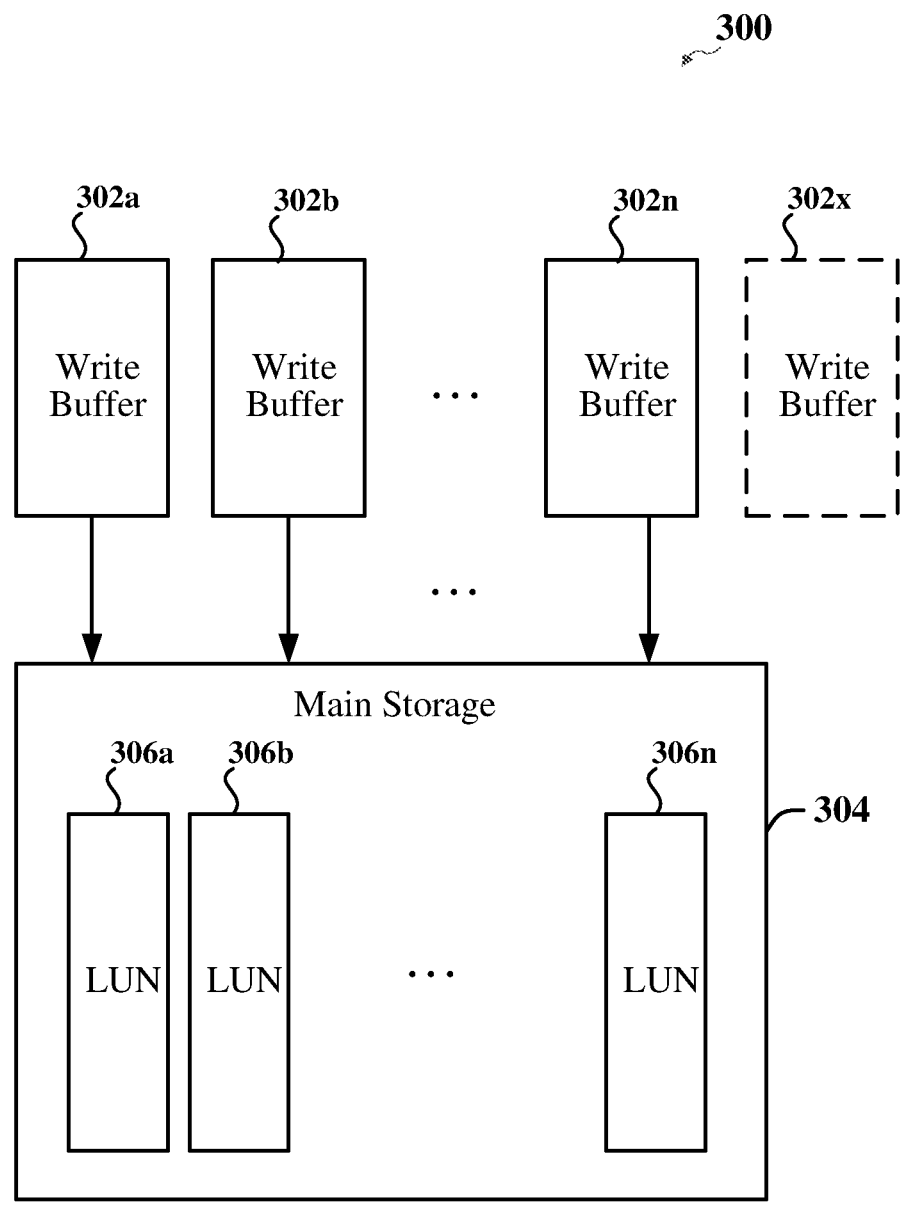
FIG. 3 is a block diagram illustrating a second storage device configuration according to some aspects of the present disclosure.

FIG. 3 illustrates a storage device configuration 300 according to some aspects of the disclosure. In one aspect, the storage device configuration 300 may be implemented using the storage device 104 of FIG. 1. For example, the nonvolatile memory 106 (FIG. 1) can be configured to provide a plurality of write buffers (e.g., write buffers 302a, 302b, . . . , and 302n) and a main storage 304 in which user data can be stored and retained. In one example, the main storage 304 can be configured as MLC or TLC memory, and the write buffers can be configured as SLC buffers that provide faster write throughput than the main storage 304. In some aspects, the main storage can be divided into multiple LUNs (e.g., LUNs 306a, 306b, . . . , and 306n shown in FIG. 3). In this example, each LUN can be associated with a dedicated write buffer. For example, first LUN 306a can be associated with first write buffer 302a, second LUN 306b can be associated with second write buffer 302b, and third LUN 306n can be associated with third write buffer 302n, and so on. In one example, if the main storage 304 has N number of LUNs, at least N number of write buffers are configured.

In some aspects, when a write buffer (e.g., write buffer 302a) associated with a LUN (e.g., LUN 306a) is not used or idle, the write buffer can be reassigned or repurposed as a secondary write buffer for an active LUN (e.g., LUN 306b). Therefore, the same active LUN has two write buffers (e.g., write buffers 302a and 302b). For example, the idle LUN can be a petition that has no pending or ongoing write/read commands, and the active LUN can be a petition that has one or more pending or ongoing write/read commands. In some aspects, the storage device can create a new dedicated write buffer (e.g., write buffer 302x) using a portion of the nonvolatile memory 106. The new dedicated write buffer can be assigned to a LUN as the secondary write buffer when the LUN's primary write buffer is unavailable, for example, during a flush operation or when there is insufficient space for new data.

Figure 4:
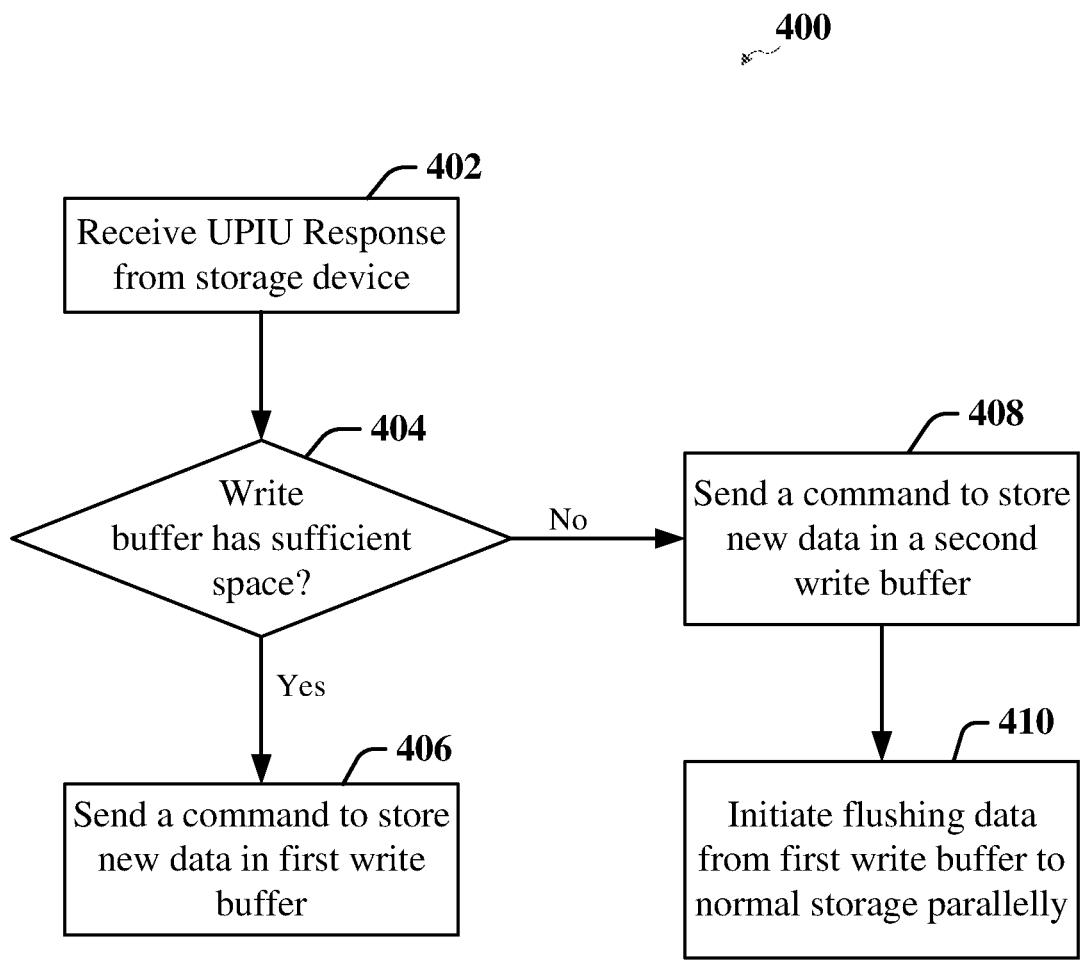
FIG. 4 is a flow diagram of an exemplary algorithm for sending commands to write buffers in a storage device according to some aspects of the present disclosure.

FIG. 4 illustrates a flow diagram of an exemplary algorithm 400 for sending commands to write buffers in a storage device according to some aspects of the disclosure. In certain aspects, the algorithm 400 can be performed using the data storage system 100 of FIG. 1 or any suitable data storage systems.

In some aspects, the host 102 may have sent a write comment to the storage device 104 to store write data in the device. At 402, the host 102 can receive a response from the storage device 104 in response to the write comment. In one example, the storage device 104 may be configured to provide a first write buffer (e.g., a primary write buffer) and a second write buffer (e.g., a secondary write buffer) for writing data to the main storage. In one aspect, the storage device (e.g., memory controller 110) can send a UPIU response (e.g., UPIU packet 500 of FIG. 5) periodically or after receiving the write command/data from the host. The UPIU response can inform the host of the current status of the write buffers (e.g., available space or usage of the write buffers). In one example, the UPIU response can include or indicate an available write buffer space of the write buffers. In one example, the UPIU response can indicate the available buffer space in bytes or a percentage of the total buffer space of one or more write buffers (e.g., write buffers 204, 206 of FIG. 2 and write buffers 302a-302n, 302x of FIG. 3). In one example, the UPIU response can indicate a buffer flush operation is in ongoing.

Returning to the algorithm of FIG. 4, at 404, the host can determine, based on the response from the storage device, whether a first write buffer has sufficient space (e.g., available free space) to store new data from the host if the host has new data to store in the storage device. In some aspects, the first write buffer can be a primary write buffer that can be shared by all LUNs or dedicated to a specific LUN of the storage device.

At 406, if the first write buffer has available space to store new data, the host can send a command to the storage device to write new data to the first write buffer (e.g., a primary write buffer). It is faster to write new data to the write buffer than the main storage because the write buffer is configured with faster memory (e.g., SLC memory) than the main storage. The command can be a write command used to write data to the storage device. The write command can write data to a specific logical block address (LBA) or associated LUN of the storage device. In one example, the command can be a UPIU packet with the appropriate fields and data payload. The header of the UPIU packet can specify that the packet is a command packet (e.g., a write request). The payload of the UPIU packet can include the data to be written to the data storage device. The UPIU packet can also indicate (e.g., using a flag or field 506 of FIG. 5) the first write buffer to be used to store the new data.

At 408, if the first write buffer does not have sufficient available space to store the new data, the host can send a command to the storage device to write new data to a second write buffer (e.g., a secondary write buffer), bypassing the primary write buffer (e.g., first write buffer). The command can be the same write command used to write data to the storage device. The write command can write data to a specific LBA or associated LUN on the device storage device. In one example, the command can be a UPIU packet that specifies that the packet is a command packet (e.g., a write request). The payload of the UPIU packet can include the data to be written to the data storage device. The UPIU packet can also indicate (e.g., using a flag or field 506 of FIG. 5) the second write buffer to be used to store the new data. At 410, the host can initiate flushing data from the first write buffer to the main storage. For example, the host can send an explicit flush command (e.g., WRITE_FLUSH command) to the storage device. For example, the memory controller 110 can ensure that all previously written data in the first write buffer is safely committed to the main storage memory before acknowledging the command.

In some aspects, the storage device 104 can store the commands (UPIU packets) received from the host in a command queue 112. Then, the storage device can extract the command information from the UPIU packet header, and execute the command. The storage device (e.g., memory controller 110) can send a response UPIU packet back to the host to indicate the status of the command.

Figure 5:
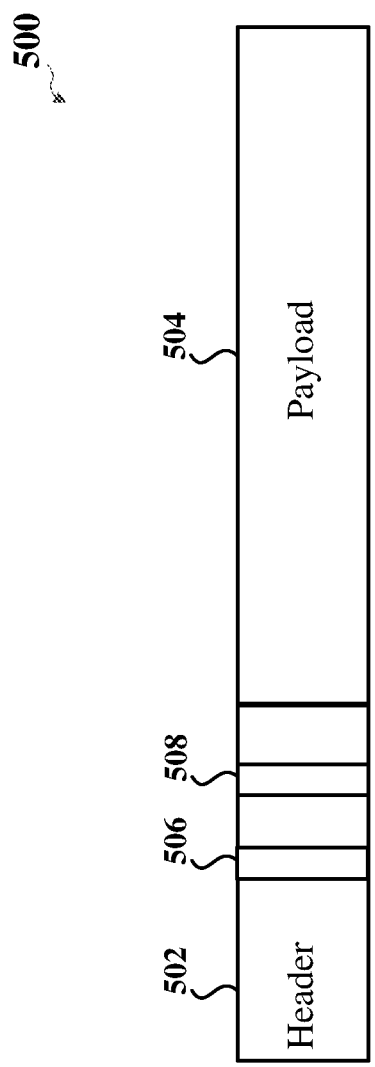
FIG. 5 is a diagram illustrating an exemplary Universal Flash Storage Protocol Information Unit (UPIU) format according to some aspects of the present disclosure.

FIG. 5 is a diagram illustrating an exemplary UPIU format according to some aspects of the present disclosure. In one example, a UPIU packet 500 may include a header 502 and a variable length payload 504. The header 502 can indicate a packet type, for example, a command or a response. The payload 504 can include command-specific data or response data, depending on the packet type. The UPIU packet 500 can include a flag or field 506 to indicate the write buffer to be used to store new data. The UPIU packet 500 can include a flag or field 508 to indicate an ongoing buffer flush operation in a certain write buffer.

Figure 6:
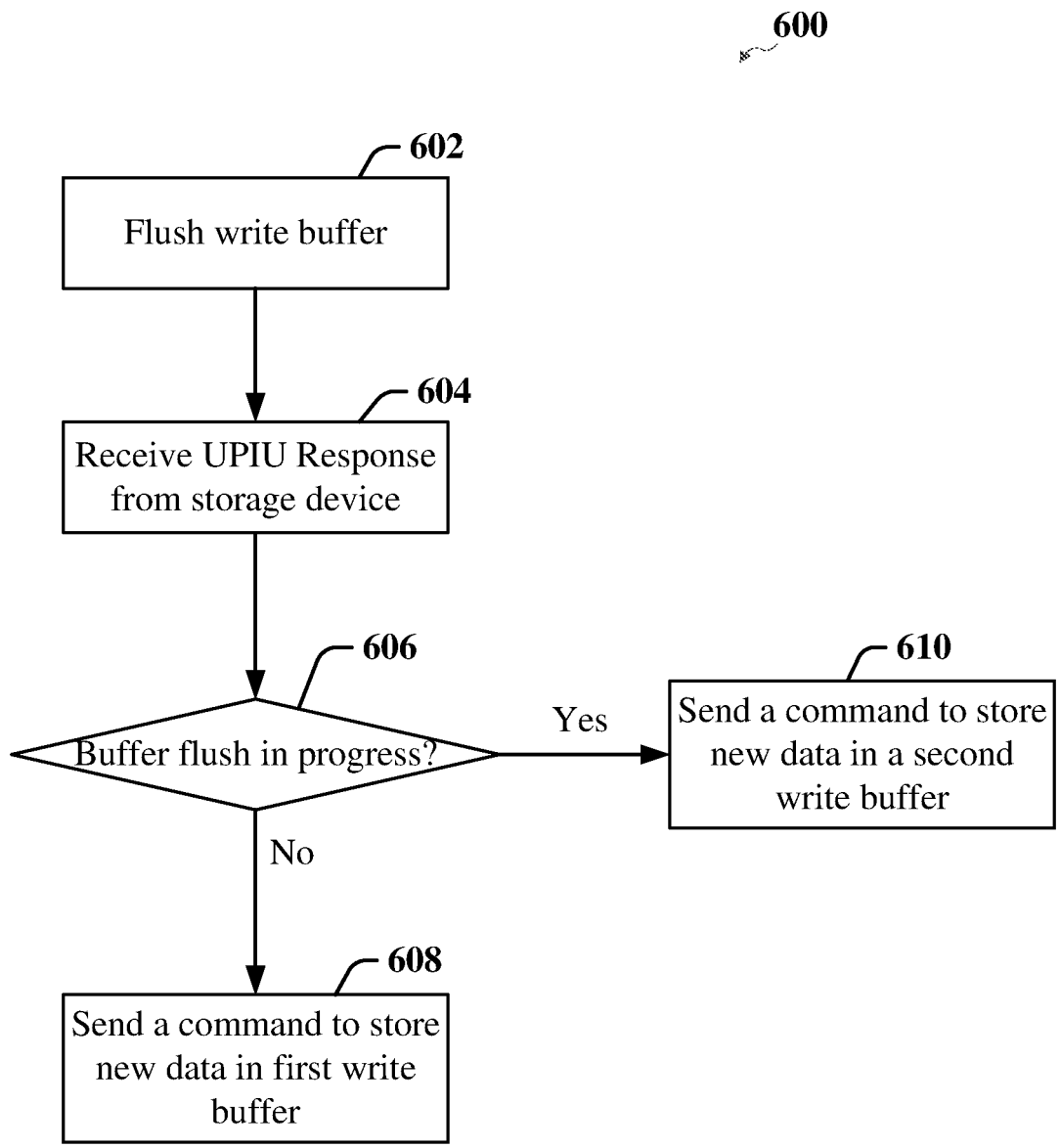
FIG. 6 is a flow diagram of an exemplary algorithm for managing buffer write and flush operations in a storage device according to some aspects of the present disclosure.

FIG. 6 illustrates a flow diagram of an exemplary algorithm 600 for managing buffer write and flush operations in a storage device according to some aspects of the disclosure. In certain aspects, the algorithm 600 can be performed using the data storage system 100 of FIG. 1 or any suitable data storage systems. In one example, the storage device 104 may be configured to provide a first write buffer (e.g., a primary write buffer) and a second write buffer (e.g., a secondary write buffer) for writing data to a main storage of the storage device.

At 602, the data storage device can perform a write buffer flush operation to move data from the write buffer to the main storage. In some aspects, the flushing of the write buffer (e.g., SLC buffer) is controlled by the memory controller 110 and/or firmware of the storage device 104. The memory controller manages the write buffers and is responsible for determining when to flush the contents of the write buffers to the main storage (e.g., main storage 208 of FIG. 2 and main storage 304 of FIG. 3). The memory controller can manage the write buffers and ensure that the contents are flushed to the main storage in a timely and efficient manner.

At 604, the host 102 can receive a response from the storage device 104. In one aspect, the storage device can send a UPIU packet (e.g., UPIU packet 500 of FIG. 5) periodically, or the storage device can send the UPIU packet to report certain events at the storage device. In one aspect, the UPIU packet can inform the host that a write buffer flush operation is in progress. For example, the UPIU packet can include a flag or field (e.g., flag or field 508 of FIG. 5) that indicates an ongoing buffer flush operation in a certain write buffer (e.g., a first write buffer). After the buffer flush operation is completed, the storage device can send another UPIU packet to indicate the completion of the buffer flush operation.

When the write buffer flush operation is in progress, the host may need to send a new write command and data to the storage device. At 606, the host can determine whether or not the storage device is performing a write buffer flush operation based on the UPIU packets received from the storage device.

At 608, if no buffer flush operation is in progress, the host can send a command to the storage device to write new data to the first write buffer (e.g., a primary write buffer). The command can be a write command used to write data to the storage device. The write command can write data to a specific LBA mapped to the first write buffer or its associated LUN. In one example, the command can be a UPIU packet that specifies the first write buffer to be used for the write data.

At 610, if a buffer flush operation is in progress in the first write buffer, the host can send a command to the storage device to write the new data to a second write buffer (e.g., a secondary write buffer), bypassing the primary write buffer (e.g., first write buffer). The storage device can receive the write command and store the command and data in the command queue when the first write buffer is being flushed. Therefore, the flushing operation of the first write buffer and data transfer to the second write buffer can occur concurrently. The write command can write data to a specific LBA or the associated LUN that is mapped to the first write buffer and the second write buffer on the storage device. In one example, the host can send the command using a UPIU packet that includes the data to be written to the second write buffer. The UPIU packet can also indicate (e.g., using the flag or field 506 of FIG. 5) the second write buffer to be used to store the new data.

In some aspects, the storage device 104 can store the commands (UPIU packets) received from the host in a command queue 112. Then, the storage device can extract the command information from the UPIU packet header, and execute the write command. The storage device (e.g., memory controller 110) can send a response UPIU packet back to the host to indicate the status of the command (e.g., completed).

Figure 7:
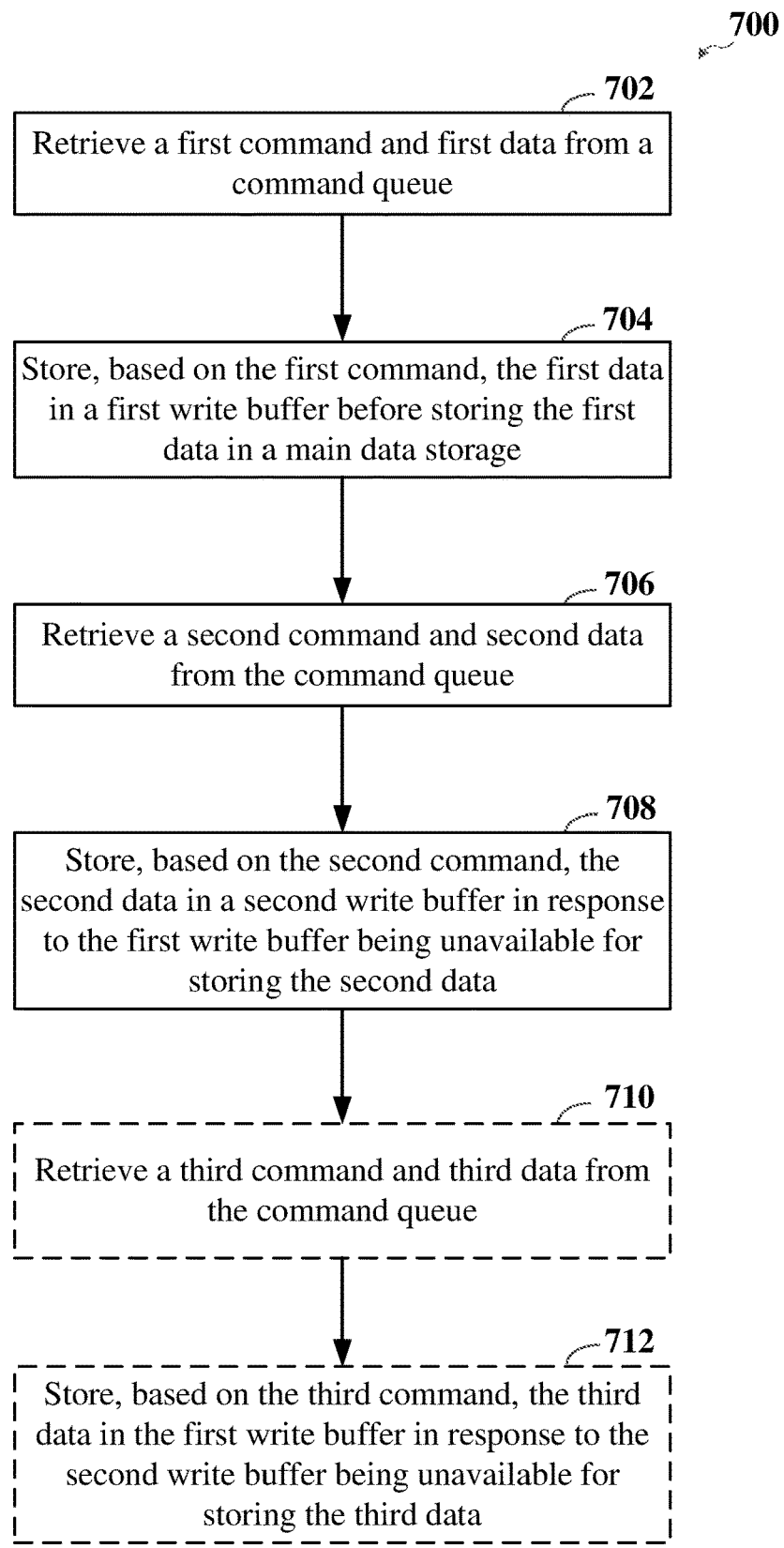
FIG. 7 illustrates a flow diagram of a method for writing data to a data storage device using write buffers according to some aspects of the present disclosure.

FIG. 7 illustrates a flow diagram of a method 700 for writing data to a data storage device using write buffers according to aspects of the present disclosure. In one example, the method 700 can be performed using the data storage system 100 of FIG. 1. In certain aspects, the method 700 provides techniques for writing data to the data storage device 104 using write buffers. In other aspects, the method may be adapted to suit other data storage devices. In some aspects, the data storage system 100 can write data to a main storage (e.g., main storage 208 of FIG. 2 or main storage 304 of FIG. 3) without suspending a flush operation of the write buffer. In some aspects, the storage device 104 can flush a write buffer when a command queue is not empty.

At 702, the method includes retrieving a first command and first data from a command queue. In one example, the host 102 and/or memory controller 110 (see FIG. 1) can provide a means to receive a first command and first data from the command queue (e.g., command queue 112 of FIG. 1). The first command may be a write command (e.g., a UPIU packet) to write the first data to a main storage (e.g., main storage 208 of FIG. 2 or main storage 304 of FIG. 3) of the storage device.

At 704, the method further includes storing, based on the first command, the first data in a first write buffer before storing the first data in the main storage. In one example, the host 102 and/or memory controller 110 can provide a means to store the first data in the first write buffer (e.g., first write buffer 204 of FIG. 2 or one of write buffers 302*a*-302*n* of FIG. 3). The first write buffer has a faster write speed or throughput than the main data storage. For example, the first write buffer may be implemented by SLC memory, and the main storage may be implemented by MLC or TLC memory.

At 706, the method includes retrieving a second command and second data from the command queue. In one example, the host 102 and/or memory controller 110 can provide a means to retrieve the second command and second data from the command queue. The second command may be a write command to write the second data to the main storage (e.g., main storage 208 of FIG. 2 or main storage 304 of FIG. 3) of the storage device. In one example, the main storage may include a plurality of logical storage units identified by corresponding LUNs. In some examples, the second command can write the second data to the same LUN used to store the first data of the first command.

At 708, the method includes storing, based on the second command, the second data in a second write buffer in response to the first write buffer being unavailable for storing the second data. In one example, the host 102 and/or memory controller 110 can provide a means to store the second data in the second write buffer. The second write buffer has a faster write speed or throughput than the main data storage. For example, the second write buffer may be implemented by SLC memory. In one example, the first write buffer is unavailable when the available or unused space of the first write buffer is not sufficient to store the second data of the second command. In one example, the first write buffer is unavailable when a flush operation is in progress or ongoing at the first write buffer. Using the second write buffer for the second data, there is no need to suspend the flush operation of the first write buffer.

At 710, the method may further include retrieving a third command and third data from the command queue. In one example, the host 102 and/or memory controller 110 can provide a means to retrieve the third command and third data from the command queue. The third command may be a write command to write the third data to the main storage (e.g., main storage 208 of FIG. 2 or main storage 304 of FIG. 3) of the storage device. In some examples, the third command can write the third data to the same LUN used to store the first data of the first command.

At 712, the method may further include storing, based on the third command, the third data in first write buffer in response to the second write buffer being unavailable for storing the third data. In one example, the host 102 and/or memory controller 110 can provide a means to store the third data in the first write buffer. In one example, the second write buffer is unavailable when the available or unused space of the second write buffer is not sufficient to store the third data of the third command. In one example, the second write buffer is unavailable when a flush operation is in progress or ongoing at the second write buffer. In this case, using the first write buffer for the third data can avoid suspending the flush operation of the second write buffer.

In some aspects, the above-described method 700 stores and manages data in a data storage system 100. The method involves receiving data from a host and storing the data in write buffers before storing the data in a main storage of the system. If there is insufficient space in a primary write buffer (first write buffer) for the new data, the data is stored in a secondary write buffer (secondary write buffer). The primary write buffer can be flushed as needed even when the command queue is not empty. The method also provides the ability to store data in different write buffers for different logical storage units (e.g., LUNs), repurpose write buffers for different LUNs, and transmit responses to the host about available space and flushing operations status.

Figure 8:
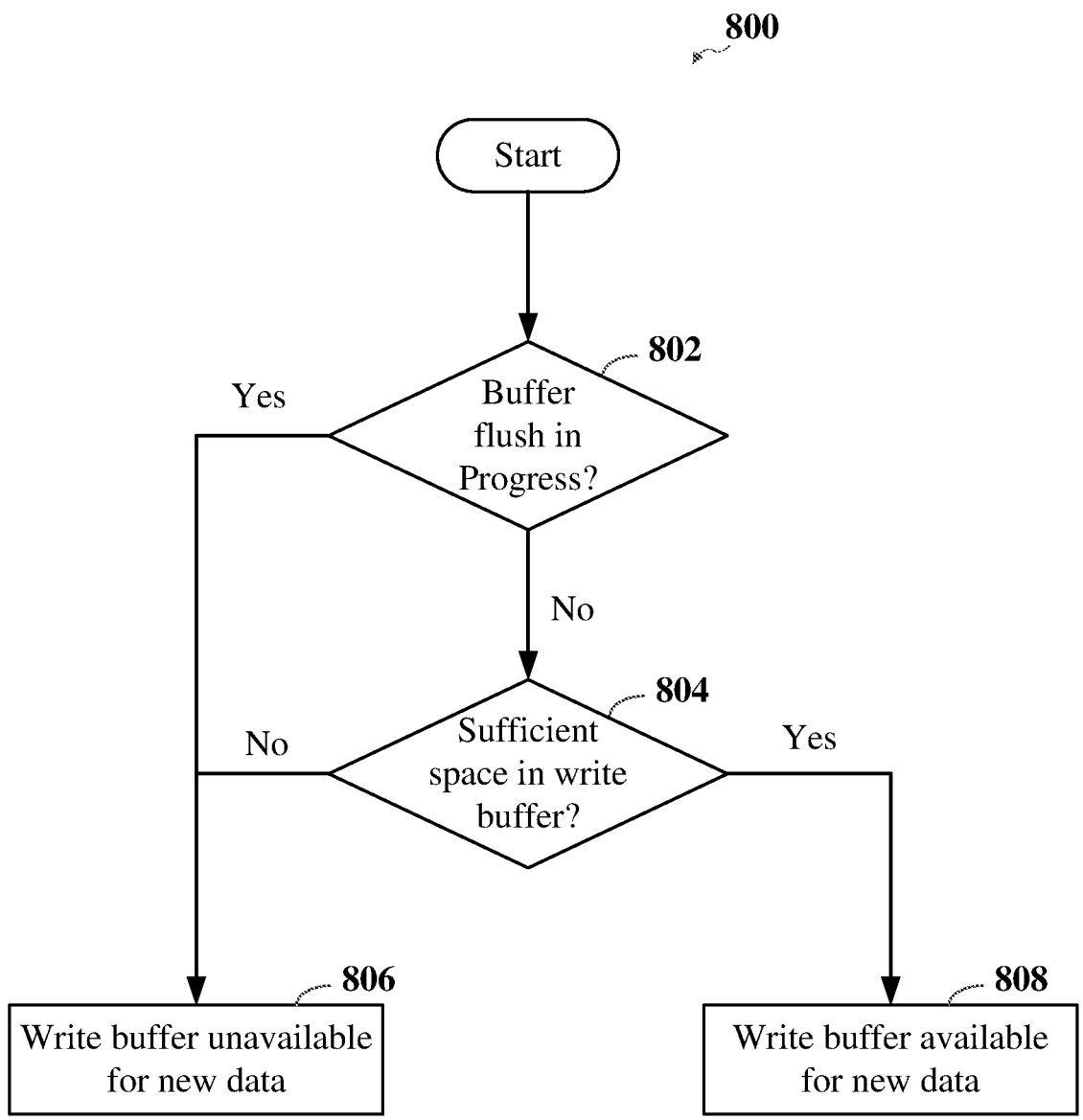
FIG. 8 is a flow diagram of a method for determining an availability of a write buffer for new data according to some aspects of the present disclosure.

FIG. 8 illustrates a flow diagram of a method 800 for determining an availability of a write buffer for new data according to some aspects of the present disclosure. In one example, the method 800 can be performed using the data storage system 100 of FIG. 1. For example, the method 800 can provide techniques for determining whether a primary write buffer (e.g., write buffer 204 of FIG. 2 or write buffer 302a of FIG. 3) is available at the storage device 104. In other aspects, the method may be adapted to suit other data storage devices. In one example, the method 800 can be used in the method 700 of FIG. 7 to determine whether to write the second data to the first buffer or the second buffer.

At 802, the method can determine whether a flush operation is in progress in the first write buffer. The storage device 104 can perform a buffer flush when the write buffer is full or stores an amount of data greater than a predetermined threshold. In some aspects, the host 102 or memory controller 110 may initiate the buffer flush operation. During the buffer flush operation, the contents of the write buffer are transferred to the main storage of the storage device 104. When the write buffer flush operation is in progress, the write buffer is not available for storing new data. In one example, the host 102 and/or memory controller 110 can provide a means to perform the buffer flush operation.

At 804, the method can determine whether the write buffer has sufficient space for storing new data. In one example, the host 102 and/or memory controller 110 can provide a means to determine the available space in the write buffer. The memory controller 110 and/or its firmware can keep track of how much space is available in the write buffer. For example, when the available space is at least equal to the size of the new data, the write buffer has sufficient space to store the new data.

At 806, the method can determine that the write buffer is unavailable when the buffer flush is in progress or the buffer does not have sufficient space for new data. At 808, the method can determine that the write buffer is available when no buffer flush is in progress and the write buffer has sufficient space to store the new data.

The following provides an overview of examples of the present disclosure.

A first aspect of the disclosure provides a data storage device, comprising: a nonvolatile memory comprising a main data storage, a first write buffer, and a second write buffer; a command queue configured to receive one or more commands from a host for accessing the nonvolatile memory; and a memory controller configured to: retrieve a first command and first data from the command queue; store, based on the first command, the first data in the first write buffer before storing the first data in the main data storage; retrieve a second command and second data from the command queue; and store, based on the second command, the second data in the second write buffer in response to the first write buffer being unavailable for storing the second data.

In a second aspect, alone or in combination with the first aspect, wherein the memory controller is further configured to determine that the first write buffer is unavailable when a flushing operating is ongoing in the first write buffer.

In a third aspect, alone or in combination with the first aspect, wherein the memory controller is further configured to: retrieve a third command and third data from the command queue; and store, based on the third command, the third data in the first write buffer in response to the second write buffer being unavailable for storing the third data.

In a fourth aspect, alone or in combination with the third aspect, wherein the memory controller is further configured to determine that the second write buffer is unavailable when a flushing operating is ongoing in the second write buffer.

In a fifth aspect, alone or in combination with any of the first, second, third, and fourth aspects, wherein the memory controller is further configured to store the second data in the second write buffer in response to an available space of the first write buffer being insufficient to store the second data.

In a sixth aspect, alone or in combination with any of the first and third aspects, wherein the memory controller is further configured to store the second data in the second write buffer, and concurrently flush the first write buffer.

In a seventh aspect, alone or in combination with any of the first and third aspects, wherein the memory controller is further configured to flush the first write buffer in response to the command queue comprising one or more commands.

In an eighth aspect, alone or in combination with the first aspect, wherein the main data storage comprises a plurality of logical storage units, and wherein the memory controller is further configured to: retrieve a third command and third data from the command queue; and store the third data in the second write buffer in response to the first write buffer being unavailable, the second data and the third data respectively associated with different ones of the plurality of logical storage units.

In a ninth aspect, alone or in combination with the first aspect, wherein: the nonvolatile memory further comprising a third write buffer; the main data storage comprises a plurality of logical storage units; and the memory controller is further configured to: retrieve a third command and third data from the command queue; and store the third data in the third write buffer, the second write buffer and the third write buffer respectively associated with different ones of the plurality of logical storage units.

In a ninth aspect, alone or in combination with the first aspect, wherein the main data storage comprises a plurality of logical storage units, and wherein the memory controller is further configured to repurpose the second write buffer as a write buffer for a different logical storage unit among the plurality of logical storage units.

In an eleventh aspect, alone or in combination with the first aspect, wherein the memory controller is further configured to transmit a response to the host, the response indicating at least one of: an available space in the first write buffer; or a flushing operation of the first write buffer.

In a twelfth aspect, alone or in combination with any of the first, second, third, fourth, eighth, ninth, tenth, and eleventh aspects, wherein the first write buffer comprises a single-level cell (SLC) memory, the second write buffer comprises a SLC memory, and the main data storage comprises a memory that stores more bits per cell than a SLC memory.

A thirteenth aspect of the disclosure provides a method of using a data storage device. The method includes: retrieving, from a host, a first command and first data from a command queue; storing, based on the first command, the first data in a first write buffer before writing the first data to a main data storage; retrieving, from the host, a second command and second data from the command queue; and storing, based on the second command, the second data in a second write buffer in response to the first write buffer being unavailable for storing the second data.

In a fourteenth aspect, alone or in combination with the thirteenth aspect, the method further includes determining that the first write buffer is unavailable when a flushing operating is ongoing in the first write buffer.

In a fifteenth aspect, alone or in combination with the thirteenth aspect, the method further includes retrieving a third command and third data from the command queue; and storing, based on the third command, the third data in the first write buffer in response to the second write buffer being unavailable for storing the third data.

In a sixteenth aspect, alone or in combination with the fifteenth aspect, the method further includes determining that the second write buffer is unavailable when a flushing operating is ongoing in the second write buffer.

In a seventeenth aspect, alone or in combination with any of the thirteenth, fourteenth, fifteenth, and sixteenth, the method further includes storing the second data in the second write buffer in response to an available space of the first write buffer being insufficient to store the second data.

In an eighteenth aspect, alone or in combination with any of the thirteenth and fifteenth aspects, the method further includes storing the second data in the second write buffer, and concurrently flushing the first write buffer.

In a nineteenth aspect, alone or in combination with any of the thirteenth and fifteenth aspects, the method further includes flushing the first write buffer in response to the command queue comprises one or more commands.

In a twentieth aspect, alone or in combination with the thirteenth aspect, wherein the main data storage comprises a plurality of logical storage units, the method further comprising: retrieving a third command and third data from the command queue; and storing the third data in the second write buffer in response to the first write buffer being unavailable, the second data and the third data respectively associated with different ones of the plurality of logical storage units.

In a twenty-first aspect, alone or in combination with the thirteenth aspect, wherein the main data storage comprises a plurality of logical storage units, the method further comprising: retrieving a third command and third data from the command queue; and storing the third data in a third write buffer, the second write buffer and the third write buffer respectively associated with different ones of the plurality of logical storage units.

In a twenty-second aspect, alone or in combination with the thirteenth aspect, wherein the main data storage comprises a plurality of logical storage units, the method further comprising: repurposing the second write buffer as a write buffer for a different logical storage unit among the plurality of logical storage units.

In a twenty-third aspect, alone or in combination with the thirteenth aspect, the method further includes: transmitting a response to the host, the response indicating at least one of: an available space in the first write buffer; or a flushing operation of the first write buffer.

In a twenty-fourth aspect, alone or in combination with any of the thirteenth, fourteenth, fifteenth, sixteenth, twentieth, twenty-first, twenty-second, and twenty-third aspects, wherein the first write buffer comprises a single-level cell (SLC) memory, the second write buffer comprises a SLC memory, and the main data storage comprises a memory that stores more bits per cell than SLC memory.

A twenty-fifth aspect of the disclosure provides a data storage device, comprising: means for retrieving a first command and first data from a command queue; means for storing, based on the first command, the first data in a first write buffer before storing the first data in a main data storage; means for retrieving a second command and second data from the command queue; and means for storing, based on the second command, the second data in a second write buffer in response to the first write buffer being unavailable for storing the second data.

In a twenty-sixth aspect, alone or in combination with the twenty-fifth aspect, the data storage device further includes means for determining that the first write buffer is unavailable when a flushing operating is ongoing in the first write buffer.

In a twenty-seventh aspect, alone or in combination with the twenty-fifth aspect, the data storage device further includes: means for retrieving a third command and third data from the command queue; and means for storing, based on the third command, the third data in the first write buffer in response to the second write buffer being unavailable for storing the third data.

In a twenty-eighth aspect, alone or in combination with the twenty-seventh aspect, the data storage device further includes means for determining that the second write buffer is unavailable when a flushing operating is ongoing in the second write buffer.

In a twenty-ninth aspect, alone or in combination with any of the twenty-fifth, twenty-sixth, twenty-seventh, and twenty-eight aspects, the data storage device further includes means for storing the second data in the second write buffer in response to an available space of the first write buffer being insufficient to store the second data.

In a thirtieth aspect, alone or in combination with any of the twenty-fifth and twenty-seventh aspects, the data storage device further includes at least one of: means for storing the second data in the second write buffer, and concurrently flush the first write buffer; or means for flushing the first write buffer in response to the command queue comprising one or more commands.

It is to be appreciated that the present disclosure is not limited to the exemplary terms used above to describe aspects of the present disclosure. For example, bandwidth may also be referred to as throughput, data rate or another term.

Any reference to an element herein using a designation e.g., "first," "second," and so forth does not generally limit the quantity or order of those elements. Rather, these designations are used herein as a convenient way of distinguishing between two or more elements or instances of an element. Thus, a reference to first and second elements does not mean that only two elements can be employed, or that the first element must precede the second element.

Within the present disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage, or mode of operation. The term "coupled" is used herein to refer to the direct or indirect electrical or other communicative coupling between two structures. Also, the term "approximately" means within ten percent of the stated value.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples described herein but is to be accorded the widest scope consistent with the principles and novel features disclosed herein.

What is claimed is:

1. A data storage device, comprising:
   a nonvolatile memory comprising a main data storage, a first write buffer, and a second write buffer;
   a command queue configured to receive one or more commands from a host for accessing the nonvolatile memory; and
   a memory controller configured to:
      retrieve a first command and first data from the command queue;
      store, based on the first command, the first data in the first write buffer before storing the first data in the main data storage;
      retrieve a second command and second data from the command queue;
      store, based on the second command, the second data in the second write buffer in response to the first write buffer being unavailable for storing the second data; and
      flush the first write buffer in response to the command queue comprising one or more commands.

2. The data storage device of claim 1, wherein the memory controller is further configured to determine that the first write buffer is unavailable when a flushing operating is ongoing in the first write buffer.

3. The data storage device of claim 1, wherein the memory controller is further configured to:
   retrieve a third command and third data from the command queue; and
   store, based on the third command, the third data in the first write buffer in response to the second write buffer being unavailable for storing the third data.

4. The data storage device of claim 3, wherein the memory controller is further configured to determine that the second write buffer is unavailable when a flushing operating is ongoing in the second write buffer.

5. The data storage device of claim 1, wherein the memory controller is further configured to store the second data in the second write buffer in response to an available space of the first write buffer being insufficient to store the second data.

6. The data storage device of claim 1, wherein the memory controller is further configured to store the second data in the second write buffer, and concurrently flush the first write buffer.

7. The data storage device of claim 1,
   wherein the main data storage comprises a plurality of logical storage units, and
   wherein the memory controller is further configured to:
      retrieve a third command and third data from the command queue; and
      store the third data in the second write buffer in response to the first write buffer being unavailable, the second data and the third data respectively associated with different ones of the plurality of logical storage units.

8. The data storage device of claim 1, wherein:
   the nonvolatile memory further comprising a third write buffer;
   the main data storage comprises a plurality of logical storage units; and
   the memory controller is further configured to:
      retrieve a third command and third data from the command queue; and
      store the third data in the third write buffer, the second write buffer and the third write buffer respectively associated with different ones of the plurality of logical storage units.

9. The data storage device of claim 1,
   wherein the main data storage comprises a plurality of logical storage units, and
   wherein the memory controller is further configured to repurpose the second write buffer as a write buffer for a different logical storage unit among the plurality of logical storage units.

10. The data storage device of claim 1, wherein the memory controller is further configured to transmit a response to the host, the response indicating at least one of:
    an available space in the first write buffer; or
    a flushing operation of the first write buffer.

11. The data storage device of claim 1, wherein the first write buffer comprises a single-level cell (SLC) memory, the second write buffer comprises a SLC memory, and the main data storage comprises a memory that stores more bits per cell than a SLC memory.

12. A method of using a data storage device, comprising:
    retrieving, from a host, a first command and first data from a command queue;
    storing, based on the first command, the first data in a first write buffer before writing the first data to a main data storage;
    retrieving, from the host, a second command and second data from the command queue;
    storing, based on the second command, the second data in a second write buffer in response to the first write buffer being unavailable for storing the second data; and
    flushing the first write buffer in response to the command queue comprises one or more commands.

13. The method of claim 12, further comprising:
    determining that the first write buffer is unavailable when a flushing operating is ongoing in the first write buffer.

14. The method of claim 12, further comprising:
    retrieving a third command and third data from the command queue; and
    storing, based on the third command, the third data in the first write buffer in response to the second write buffer being unavailable for storing the third data.

15. The method of claim 14, further comprising:
    determining that the second write buffer is unavailable when a flushing operating is ongoing in the second write buffer.

16. The method of claim 12, further comprising:
    storing the second data in the second write buffer in response to an available space of the first write buffer being insufficient to store the second data.

17. The method of claim 12, further comprising:
storing the second data in the second write buffer, and concurrently flushing the first write buffer.

18. The method of claim 12, wherein the main data storage comprises a plurality of logical storage units, the method further comprising:
retrieving a third command and third data from the command queue; and
storing the third data in the second write buffer in response to the first write buffer being unavailable, the second data and the third data respectively associated with different ones of the plurality of logical storage units.

19. The method of claim 12, wherein the main data storage comprises a plurality of logical storage units, the method further comprising:
retrieving a third command and third data from the command queue; and
storing the third data in a third write buffer, the second write buffer and the third write buffer respectively associated with different ones of the plurality of logical storage units.

20. The method of claim 12, wherein the main data storage comprises a plurality of logical storage units, the method further comprising:
repurposing the second write buffer as a write buffer for a different logical storage unit among the plurality of logical storage units.

21. The method of claim 12, further comprising:
transmitting a response to the host, the response indicating at least one of:
an available space in the first write buffer; or
a flushing operation of the first write buffer.

22. The method of claim 12, wherein the first write buffer comprises a single-level cell (SLC) memory, the second write buffer comprises a SLC memory, and the main data storage comprises a memory that stores more bits per cell than SLC memory.

23. A data storage device, comprising:
means for retrieving a first command and first data from a command queue;
means for storing, based on the first command, the first data in a first write buffer before storing the first data in a main data storage;
means for retrieving a second command and second data from the command queue;
means for storing, based on the second command, the second data in a second write buffer in response to the first write buffer being unavailable for storing the second data; and
means for storing the second data in the second write buffer, and concurrently flush the first write buffer; or
means for flushing the first write buffer in response to the command queue comprising one or more commands.

24. The data storage device of claim 23, further comprising:
means for determining that the first write buffer is unavailable when a flushing operating is ongoing in the first write buffer.

25. The data storage device of claim 23, further comprising:
means for retrieving a third command and third data from the command queue; and
means for storing, based on the third command, the third data in the first write buffer in response to the second write buffer being unavailable for storing the third data.

26. The data storage device of claim 25, further comprising:
means for determining that the second write buffer is unavailable when a flushing operating is ongoing in the second write buffer.

27. The data storage device of claim 23, further comprising:
means for storing the second data in the second write buffer in response to an available space of the first write buffer being insufficient to store the second data.

* * * * *